(12) United States Patent
Takayama (10) Patent No.: US 12,549,847 B2
(45) Date of Patent: Feb. 10, 2026

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yuiko Takayama, Kanagawa (JP)

(73) Assignee: Canon Kabushiki Kaisha

( * ) Notice: Subject to any disclaimer, the term of this patent is extended or adjusted under 35 U.S.C. 154(b) by 0 days.

(21) Appl. No.: 18/953,957

(22) Filed: Nov. 20, 2024

(65) Prior Publication Data

US 2025/0184599 A1 Jun. 5, 2025

(30) Foreign Application Priority Data

Nov. 30, 2023 (JP) ................. 2023-202405

(51) Int. Cl.
*H04N 23/63* (2023.01)
*H04N 23/60* (2023.01)
*H04N 23/695* (2023.01)
*H04N 23/698* (2023.01)

(52) U.S. Cl.
CPC ........... *H04N 23/635* (2023.01); *H04N 23/64* (2023.01); *H04N 23/695* (2023.01); *H04N 23/698* (2023.01)

(58) Field of Classification Search
CPC ............................ H04N 2201/3254
USPC .......................................... 348/37
See application file for complete search history.

(56) References Cited

U.S. PATENT DOCUMENTS

| 2010/0328431 A1* | 12/2010 | Kim | H04N 23/698 |
| | | | 348/208.4 |
| 2014/0240576 A1* | 8/2014 | Chun | H04N 23/631 |
| | | | 348/333.03 |

FOREIGN PATENT DOCUMENTS

| JP | 2012191425 A | 10/2012 |
| JP | 2019186635 A | 10/2019 |

* cited by examiner

*Primary Examiner* — Jeffery A Williams
(74) *Attorney, Agent, or Firm* — Canon U.S.A., Inc., IP Division (57) ABSTRACT

An information processing apparatus includes a hardware processor, and a memory for storing instructions to be executed by the hardware processor, wherein, when the instructions stored in the memory are executed by the hardware processor, the information processing apparatus functions as an acquisition unit configured to acquire a first captured image including a captured image of a range imageable by performing a rotation drive that rotates an imaging unit around an optical axis, and an superimposing unit configured to superimpose an image indicating an imaging range at a time of the rotation drive on the first captured image acquired by the acquisition unit.

9 Claims, 9 Drawing Sheets

INFORMATION PROCESSING APPARATUS, CONTROL METHOD FOR INFORMATION PROCESSING APPARATUS, AND STORAGE MEDIUM

BACKGROUND

Field of the Disclosure

The present disclosure relates to an information processing apparatus suitably used for an imaging system including an imaging apparatus capable of performing rotation drive, a control method therefor, and a storage medium.

Description of the Related Art

There has been an imaging apparatus including a rotation drive mechanism for rotating an imaging unit around an optical axis in addition to a panning drive mechanism and a tilting drive mechanism. The rotation drive mechanism makes it possible to acquire a vertically long imaging range (perform vertical image capturing) in addition to acquiring a horizontally long imaging range (perform horizontal image capturing), and a user can select the horizontal image capturing or the vertical image capturing depending on an object. In this case, the user has to rotate the imaging unit every time using the rotation drive mechanism to grasp the imaging range of the horizontal image capturing and the imaging range of the vertical image capturing. Accordingly, the user cannot grasp the imaging range of the horizontal image capturing and the imaging range of the vertical image capturing at a time, and thus it is difficult to compare them.

There has been known a technique of generating a wide range image by composition to assist a user to set an imaging range. For example, Japanese Patent Application Laid-Open No. 2019-186635 discusses a technique of displaying a first image captured by a wide range camera including a plurality of cameras and a second image captured by a pan/tilt/zoom (PTZ) camera on a screen to allow a user to designate, on the screen, an image capturing region of the PTZ camera. Further, Japanese Patent Application Laid-Open No. 2012-191425 discusses a technique of generating a panoramic image by controlling an imaging direction of an imaging unit whose imaging range has a long side and a short side. The techniques discussed in Japanese Patent Application Laid-Open No. 2019-186635 and Japanese Patent Application Laid-Open No. 2012-191425 are not techniques for allowing the user to easily grasp the imaging range of the horizontal image capturing and the imaging range of the vertical image capturing.

To assist a user to set an imaging range, it is required to allow the user to easily grasp an imaging range at a time of performing a rotation drive.

SUMMARY

The present disclosure is directed to a technique for allowing a user to easily grasp the imaging range at the time of performing the rotation drive.

According to an aspect of the present disclosure, an information processing apparatus includes a hardware processor, and a memory for storing instructions to be executed by the hardware processor, wherein, when the instructions stored in the memory are executed by the hardware processor, the information processing apparatus functions as an acquisition unit configured to acquire a first captured image including a captured image of a range imageable by performing a rotation drive that rotates an imaging unit around an optical axis, and an superimposing unit configured to superimpose an image indicating an imaging range at a time of the rotation drive on the first captured image acquired by the acquisition unit.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described with reference to the attached drawings.

Figure 1:
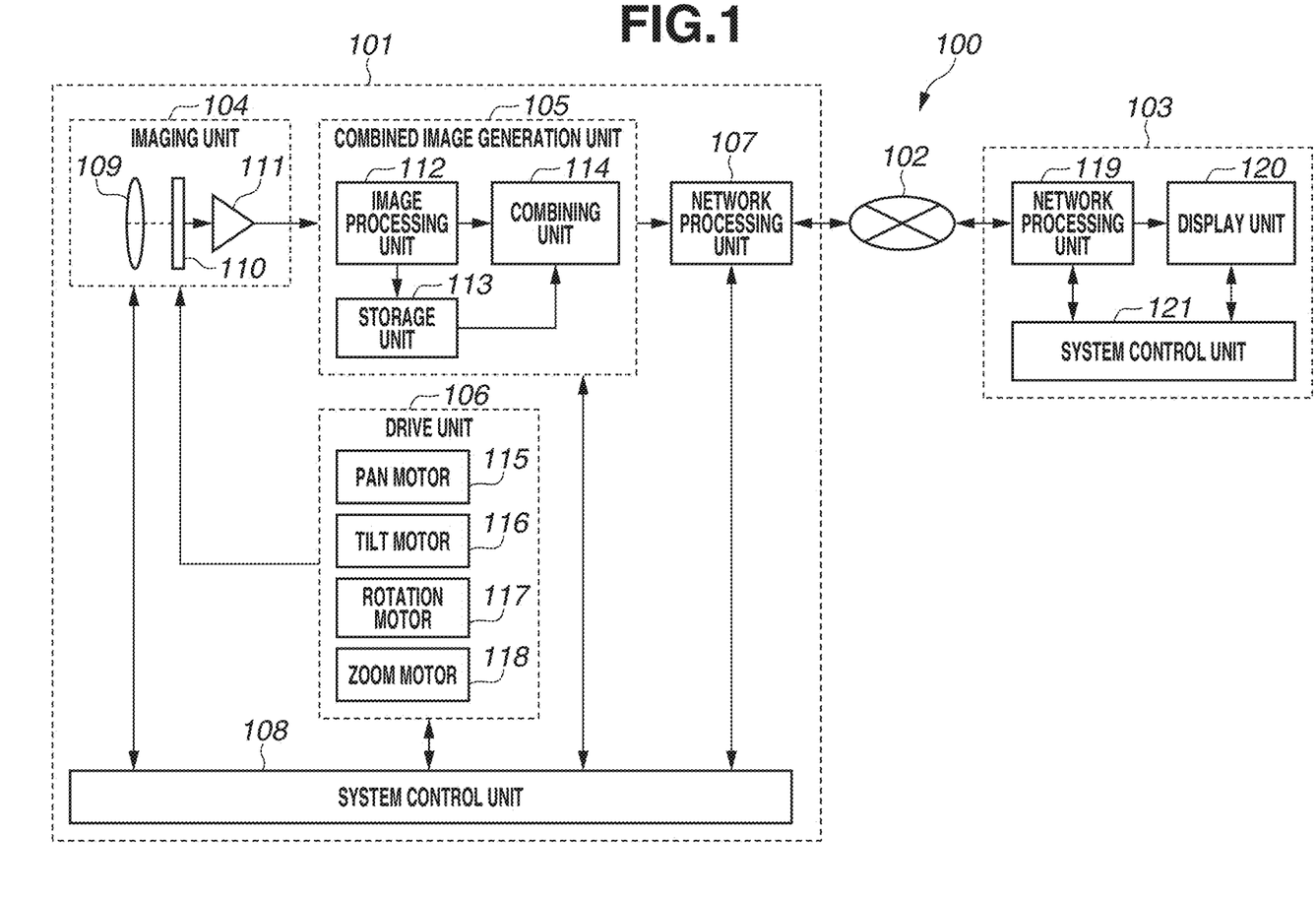
FIG. 1 is a block diagram illustrating a configuration of an imaging system according to a first exemplary embodiment.

FIG. 1 is a block diagram illustrating a configuration of an imaging system 100 according to a first exemplary embodiment.

The imaging system 100 includes an imaging apparatus 101 and a client apparatus 103, connected with each other via a network 102.

The imaging apparatus 101 is an imaging apparatus called a network camera, and includes an imaging unit 104, a combined image generation unit 105, a drive unit 106, a network processing unit 107, and a system control unit 108. The client apparatus 103 includes a network processing unit 119, a display unit 120, and a system control unit 121.

In the imaging apparatus 101, the imaging unit 104 includes an image sensor 110 that receives light on a light receiving surface thereof via a lens 109, and an amplifier 111 that amplifies light data generated based on the received light, to output an image signal generated based on the light data.

The combined image generation unit 105 includes an image processing unit 112, a storage unit 113, and a combining unit 114. The image processing unit 112 receives the image signal from the imaging unit 104, performs image processing such as development processing thereon, and generates a captured image. The storage unit 113 stores and holds the captured image generated by the image processing unit 112. The combining unit 114 performs combining processing for combining captured images held in the storage unit 113, which will be described in detail below. Further, the combining unit 114 performs superimposing processing for superimposing an assist image, which is an image indicating an imaging range at a rotation drive time, on an image generated by the combining processing.

The drive unit 106 includes a pan motor 115, a tilt motor 116, a rotation motor 117, and a zoom motor 118. The pan motor 115 and the tilt motor 116 change an imaging direction (i.e., panning drive and tilting drive) by moving the imaging unit 104 in response to instructions from the system control unit 108. The rotation motor 117 rotates the imaging unit 104 around an optical axis to change an imaging angle (i.e., rotation drive) in response to an instruction from the system control unit 108. The zoom motor 118 drives the lens 109 to change an imaging magnification in response to an instruction from the system control unit 108.

The network processing unit 107 converts the captured image processed by the combined image generation unit 105 in conformity to a network protocol and delivers the converted image to the network 102.

The system control unit 108 collectively controls the components of the imaging apparatus 101 and sets various kinds of parameters. More specifically, the system control unit 108 controls the combined image generation unit 105, the drive unit 106, and the network processing unit 107. A function of the system control unit 108 is implemented, for example, by a central processing unit (CPU) executing a predetermined program.

In the client apparatus 103, the network processing unit 119 receives the captured image delivered via the network 102 and outputs the image to the display unit 120.

The display unit 120 displays the received captured image, and an operation unit (not illustrated) or the like for a user to operate the drive unit 106 of the imaging apparatus 101.

The system control unit 121 collectively controls the components of the client apparatus 103 and sets various kinds of parameters. More specifically, the system control unit 121 controls the network processing unit 119 and the display unit 120. A function of the system control unit 121 is implemented, for example, by a CPU executing a predetermined program.

With reference to FIGS. 2A to 2D, the panning drive, the tilting drive, and the rotation drive of the imaging apparatus 101 will be described. FIGS. 2A to 2D are diagrams illustrating an external appearance of the imaging apparatus 101.

As illustrated in FIGS. 2A to 2D, the imaging apparatus 101 includes a fixed portion 101a fixed to an installation position such as a ceiling, and a dome-shaped movable portion 101b disposed on the fixed portion 101a. An imaging unit portion 101c including the imaging unit 104 is mounted on the movable portion 101b. The imaging unit portion 101c can perform the rotation drive that rotates the imaging unit 104 around the optical axis.

Figure 2A:
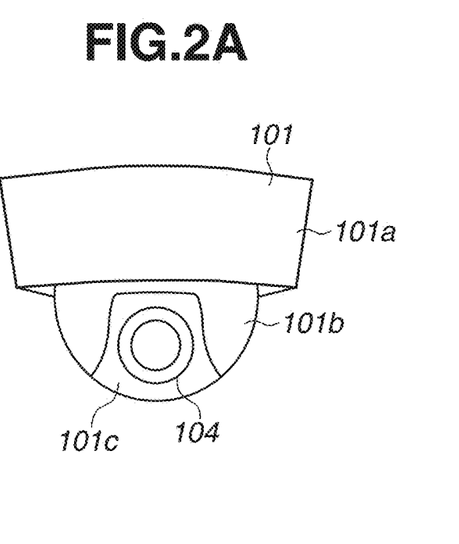
FIGS. 2A, 2B, 2C, and 2D are diagrams illustrating an external appearance of an imaging apparatus according to the first exemplary embodiment.
Figure 2B:
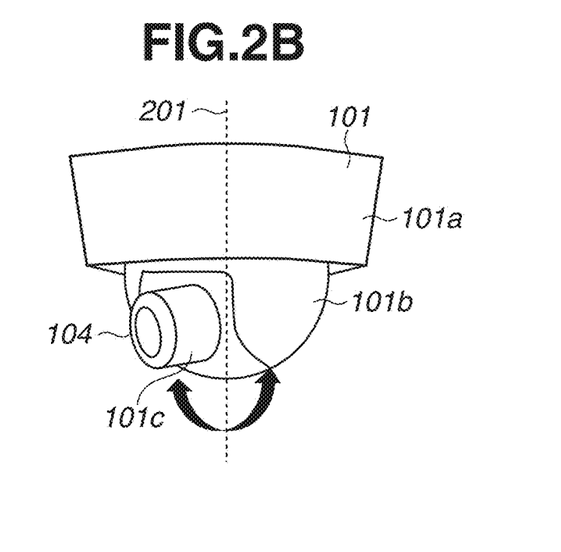
Figure 2C:
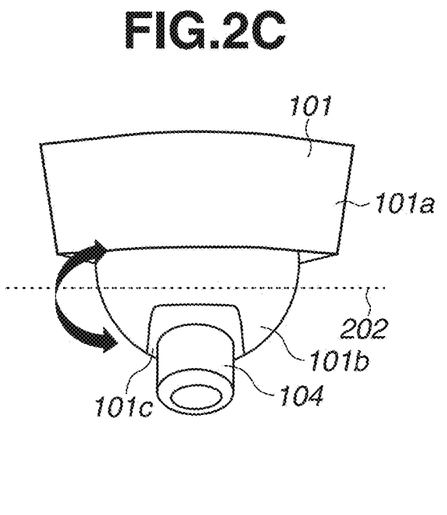
Figure 2D:
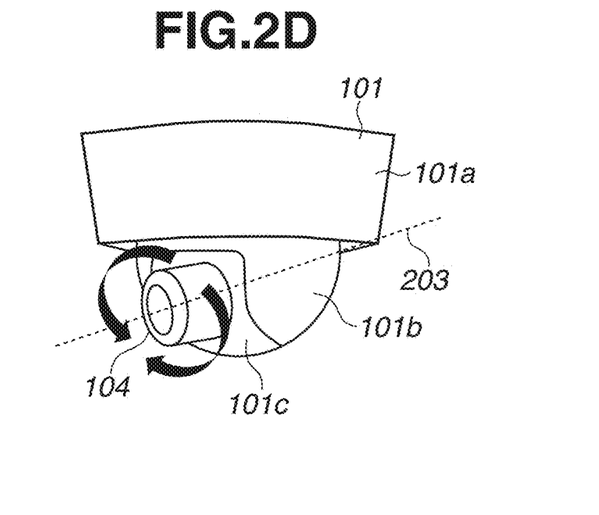

FIG. 2A is a diagram illustrating the imaging apparatus 101 viewed from the front side. FIG. 2B illustrates a state where the panning drive is performed by rotating the movable portion 101b around a pan rotation axis 201. The imaging range in a horizontal direction can be changed with respect to the state in FIG. 2A. FIG. 2C illustrates a state where the tilting drive is performed by rotating the imaging unit portion 101c around a tilt rotation axis 202. The imaging range in a vertical direction can be changed with respect to the state in FIG. 2A. In the present exemplary embodiment, the panning drive and the tilting drive correspond to an imaging direction change drive according to the present exemplary embodiment. FIG. 2D illustrates a state where the rotation drive is performed by rotating the imaging unit 104 around a rotation axis (optical axis) 203. By a rotational movement of the imaging range around the optical axis with respect to the state in FIG. 2A, the imaging range of the imaging apparatus 101 can be changed to horizontal image capturing or vertical image capturing.

Figure 3A:
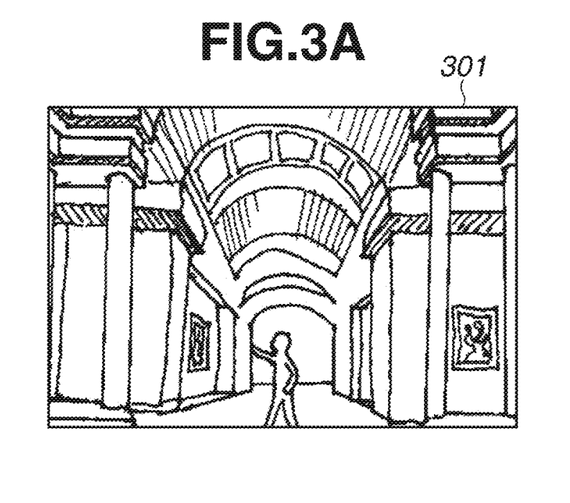
FIGS. 3A, 3B, and 3C are diagrams illustrating examples of captured images captured by the imaging apparatus according to the first exemplary embodiment.
Figure 3B:
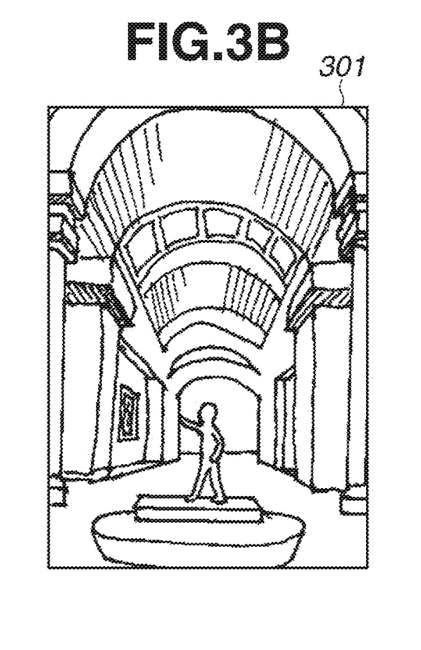
Figure 3C:
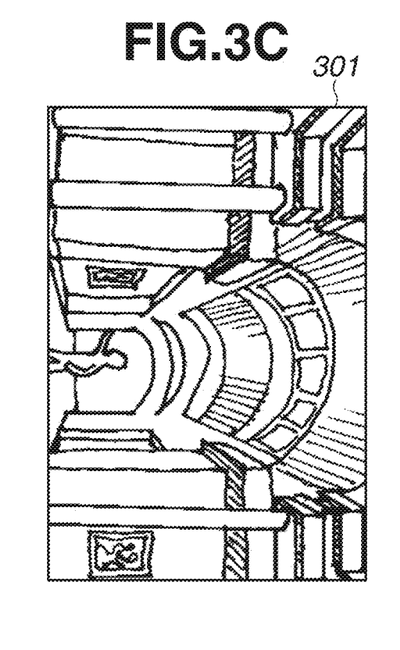

With reference to FIGS. 3A to 3C, the captured image captured by the imaging apparatus 101 will be described. FIGS. 3A to 3C are diagrams each illustrating an example of the captured image captured by the imaging apparatus 101.

FIG. 3A illustrates a captured image 301 captured when the horizontal image capturing is performed. At this time, the rotation drive is not performed, and the imaging unit 104 has not rotated. FIG. 3B illustrates the captured image 301 captured when the vertical image capturing is performed. At this time, the rotation drive is performed to rotate the imaging unit 104 90° clockwise. The orientation of the captured image 301 in FIG. 3B is erect as in FIG. 3A. FIG. 3C illustrates the captured image 301 immediately after rotating the imaging unit 104 90° clockwise by performing the rotation drive from the state in FIG. 3A. Immediately after the rotation of the imaging unit 104, the captured image 301 is rotated 90° clockwise from the erect direction, and the captured image 301 can be changed to the vertical image capturing in the erect direction as in FIG. 3B by performing image processing of rotating the captured image 301 90° counterclockwise.

In this case, if the user is to perform the rotation drive every time to grasp the imaging range of the horizontal image capturing and the imaging range of the vertical image capturing, the user cannot grasp both the imaging range of the horizontal image capturing and the imaging range of the vertical image capturing at a time.

Thus, as described in detail below, in the imaging apparatus 101, the combined image generation unit 105 acquires a first captured image 406 including a captured image in a range that can be captured (imageable range) by performing the rotation drive at a predetermined acquisition timing, under the control of the system control unit 108. Then, the combined image generation unit 105 generates a combined image 401 obtained by combining the first captured image 406 and a second captured image 405 that is a current captured image. Further, the combined image generation unit 105 superimposes an assist image indicating an imaging range at the rotation drive time, on the combined image 401. The network processing unit 107 transmits the combined image 401 on which the assist image is superimposed to the client apparatus 103. In the client apparatus 103, the network processing unit 119 receives the combined image 401 on which the assist image is superimposed and displays the combined image 401 on the display unit 120, under the control of the system control unit 121. In the present exemplary embodiment, the combined image generation unit 105 operating under the control of the system control unit 108 functions as an acquisition unit, a combining unit, and a superimposing unit according to the present disclosure.

Figure 4:
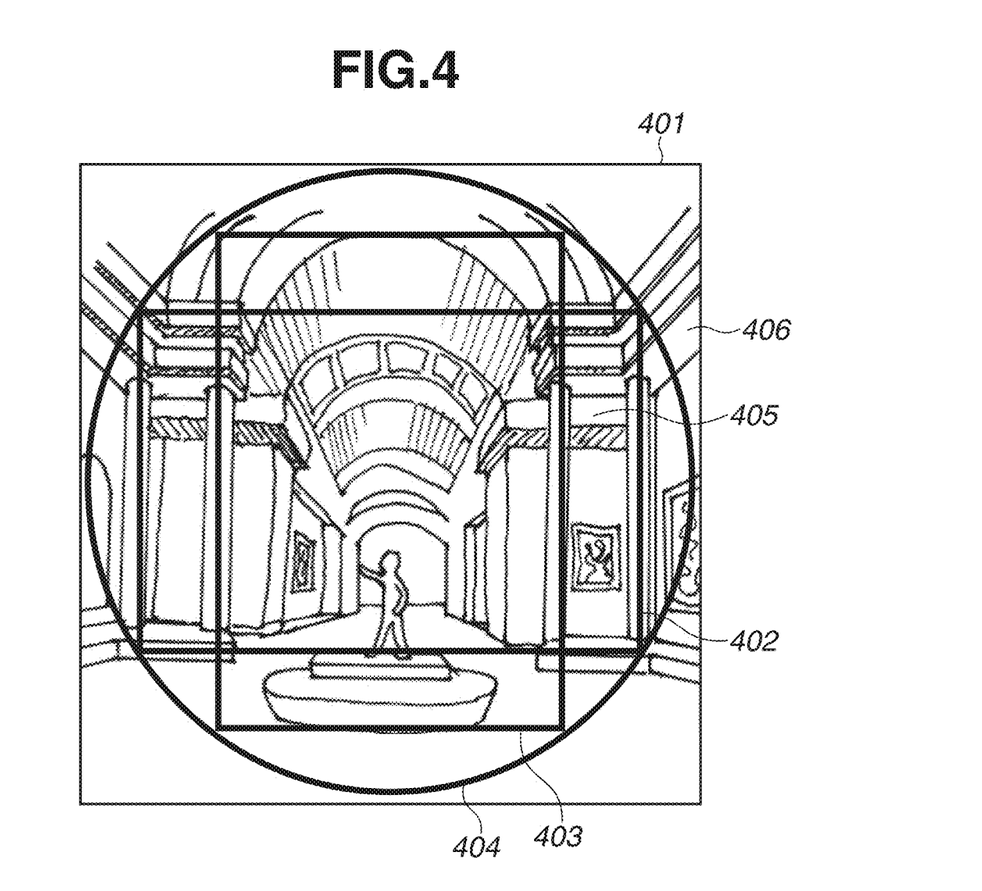
FIG. 4 is a diagram illustrating an example of an image displayed by the imaging system according to the first exemplary embodiment.

With reference to FIG. 4, the combined image 401 on which the assist image has been superimposed and displayed on the display unit 120 will be described. FIG. 4 is a diagram illustrating an example of an image displayed by the imaging system 100.

The combined image 401 is an image generated by combining the first captured image 406, which includes the captured image of a range imageable by performing the rotation drive, and the second captured image 405, which is the current captured image. The example in FIG. 4 is a combined image generated when the current imaging is the horizontal image capturing. The latest captured image is sequentially displayed as the second captured image 405, but the first captured image 406 is an image fixed until an image is acquired again at a predetermined timing and is a previous captured image with respect to the second captured image 405. An acquisition method of the first captured image 406 will be described below with reference to FIGS. 5A, 5B, and 5C.

Further, a circular frame 404 and two rectangular frames 402 and 403 are superimposed on the combined image 401, as assist images. The circular frame 404 indicates a range imageable by performing the rotation drive. The rectangular frame 402 indicates an imaging range at a time of the horizontal image capturing, and the rectangular frame 403 indicates an imaging range at a time of the vertical image capturing. In the example in FIG. 4, inside the rectangular frame 402 is the second captured image 405, and outside the rectangular frame 402 is the first captured image 406. In this way, the rectangular frame 402 corresponding to the second captured image 405 and the rectangular frame 403 having a same size as the rectangular frame 402 and being arranged to be coaxial and orthogonal to the rectangular frame 402 are displayed. The circular frame 404 is a circle with a diagonal line of each of the rectangular frames 402 and 403 as a diameter.

In this way, the user can grasp the imaging range of the horizontal image capturing and the imaging range of the vertical image capturing at a time by superimposing the rectangular frames 402 and 403 each serving as the assist image.

Figure 5A:
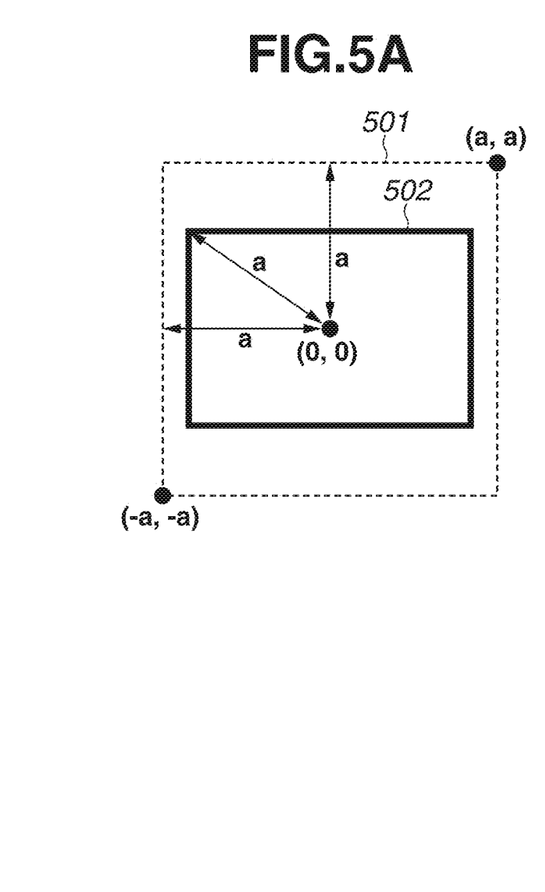
FIGS. 5A, 5B, and 5C are diagrams illustrating an acquisition method of a first captured image.
Figure 5B:
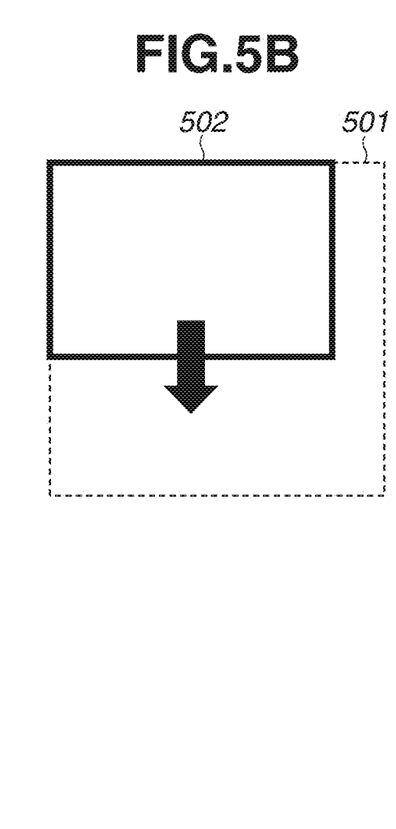
Figure 5C:
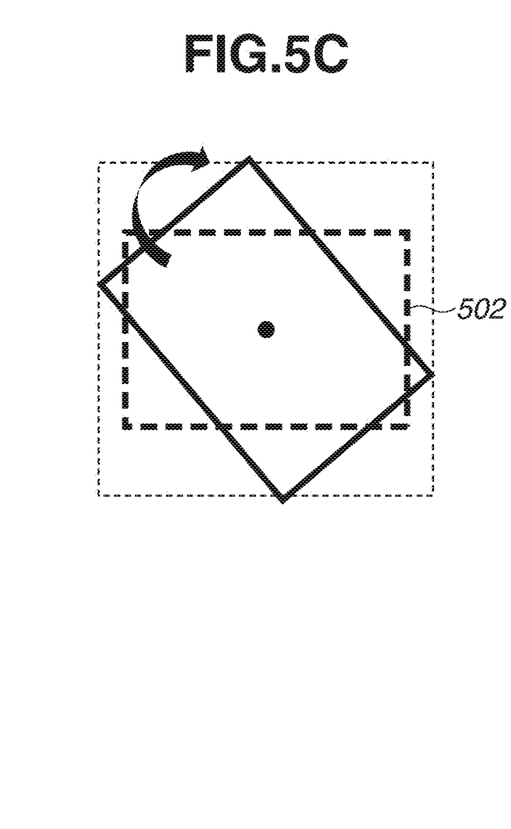

Next, with reference to FIGS. 5A, 5B, and 5C, an acquisition method of the first captured image 406 will be described. FIGS. 5A, 5B, and 5C are diagrams illustrating the acquisition method of the first captured image 406.

FIGS. 5A and 5B illustrate a method of acquiring the first captured image 406 by performing the panning drive and the tilting drive. In this example, the first captured image 406 is acquired by limiting to a range required to superimpose the circular frame 404. A distance "a" from the center of a current imaging range 502 to each corner thereof serves as a radius of a range imageable by performing the rotation drive. Thus, first, the distance "a" is calculated. Next, a panning/tilting drive range 501 is calculated. A distance from the center of the current imaging range 502 to a panning drive end and a distance therefrom to a tilting drive end are each equal to the distance "a". When coordinates of the center of the current imaging range 502 are assumed to be (0, 0), the panning/tilting drive range 501 is calculated as a range between coordinates (−a, −a) and coordinates (a, a). After the panning/tilting drive range 501 is calculated, as illustrated in FIG. 5B, the panning drive and the tilting drive are performed, to acquire a captured image within the panning/tilting drive range 501. In this way, the first captured image 406 is generated by combining the captured images obtained by performing the panning drive and the tilting drive.

In a case where the current imaging range 502 has moved to a telephoto side by performing a zoom drive, the first captured image 406 may be acquired after a zoom drive to a wide-angle side.

In addition, in a case where the current imaging range 502 is located at a panning drive end or a tilting drive end, even if an attempt to acquire the first captured image 406 is made, the panning drive or the tilting drive cannot be performed, and the first captured image 406 cannot be acquired. In this case, the user is notified that the current imaging range 502 is at the panning drive end or the tilting drive end. Then, the current imaging range 502 is changed by performing the panning drive or the tilting drive, or the first captured image 406 is generated by limiting an acquisition range of the first captured image 406.

FIG. 5C illustrates a method of acquiring the first captured image 406 by performing the rotation drive. In this case, with the position of the current imaging range 502 as a reference, the captured image is acquired by rotating the current imaging range 502 90° clockwise from 0°. By combining the captured images acquired by performing the rotation drive in this way, the first captured image 406 is generated. In this case, since the first captured image 406 becomes a circular image, when the first captured image 406 is displayed on the display unit 120, for example, the first captured image 406 is shaped to be rectangular by filling the four corners with black images. In addition, the rotation angle is not limited to 90° clockwise from 0°. The rotation angle may be, for example, 45° clockwise from 0°, or 45° counterclockwise from 0°.

The timing at which the current imaging range 502 is changed is to be a predetermined acquisition timing to acquire the first captured image 406. When the current imaging range 502 is changed, the first captured image 406 is acquired again. In addition, for example, a timing satisfying a condition set by a user in advance may be the predetermined acquisition timing. For example, when a predetermined time has elapsed, the first captured image 406 is acquired again.

Figure 6A:
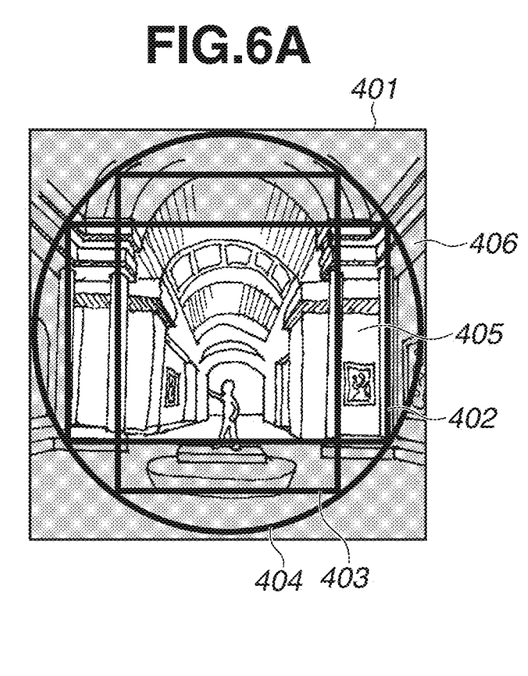
FIGS. 6A and 6B are diagrams each illustrating an example of an image displayed by the imaging system according to the first exemplary embodiment.
Figure 6B:
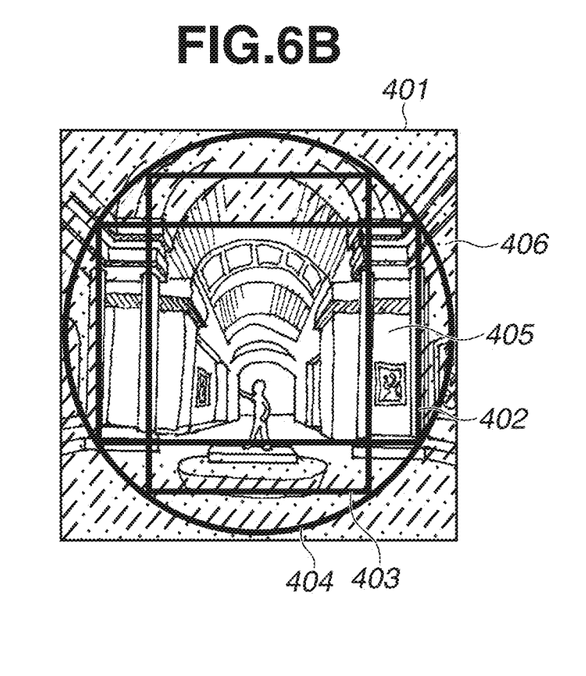

In FIG. 4, in the combined image 401, the first captured image 406 and the second captured image 405 are displayed without being distinguished, but as illustrated in FIGS. 6A and 6B, the first captured image 406 and the second captured image 405 may be displayed distinguishably.

In FIG. 6A, the brightness of the first captured image 406 and the brightness of the second captured image 405 are made different. For example, it is possible to easily distinguish the first captured image 406 and the second captured image 405 by making the first captured image 406 dark and the second captured image 405 bright. A predetermined setting value may be used for each of the brightness of the second captured image 405 and the brightness of the first captured image 406, or a user may set each of the brightness of the second captured image 405 and the brightness of the first captured image 406.

In FIG. 6B, a pattern is superimposed on the first captured image 406. The second and first captured images 405 and 406 can be easily distinguished based on whether the pattern is superimposed. However, types of the patterns are not limited to the illustrated pattern, and any patter may be used as long as the second and first captured images 405 and 406 can be distinguished.

Figure 7A:
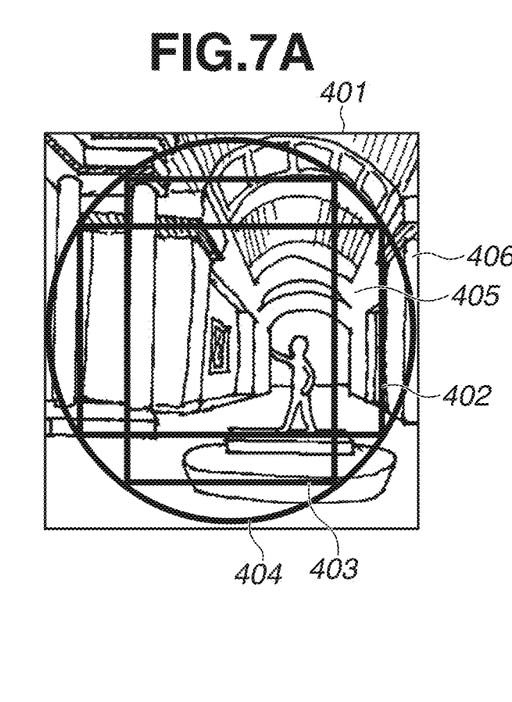
FIGS. 7A, 7B, and 7C are diagrams illustrating reacquisition processing of the first captured image.
Figure 7B:
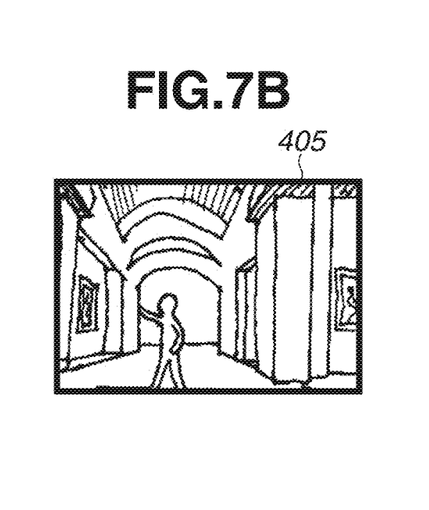
Figure 7C:
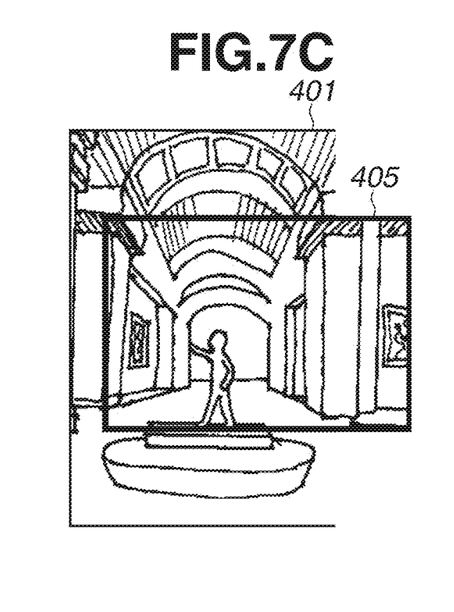

Next, with reference to FIGS. 7A, 7B, and 7C, reacquisition processing of the first captured image 406 performed when the current imaging range 502 is changed will be described. FIGS. 7A, 7B, and 7C are diagrams illustrating the reacquisition processing of the first captured image 406. When the current imaging range 502, i.e., the imaging range of the second captured image 405, is changed by performing the panning drive, the tilting drive, or the rotation drive, the first captured image 406 is acquired again.

FIG. 7A illustrates the combined image 401 before the imaging range of the second captured image 405 is changed. In this state, assume that the imaging range of the second captured image 405 is changed by performing the panning drive.

In this case, the first captured image 406 is acquired again with the changed imaging range as a reference to newly generate the combined image 401. First, the first captured image 406 and the frames 402 to 404 are deleted, and as illustrated in FIG. 7B, only the second captured image 405 after the imaging range thereof is changed is displayed. Next, using the acquisition method described with reference to FIGS. 5A, 5B, and 5C, the first captured image 406 is acquired again. Then, the reacquired first captured image 406 and the second captured image 405 after the imaging range is changed are combined, and the frames 402 to 404 are superimposed thereon.

In a case where first captured images 406 before and after the change of the imaging range of the second captured image 405 overlap, the first captured image 406 may be acquired again only for an insufficient range. FIG. 7C illustrates a case where the first captured images 406 overlap in the state of FIG. 7B. In an overlapped range, the first captured image 406 acquired before the change is left without being deleted. Then, the first captured image 406 is acquired again only for the insufficient range.

Figure 8:
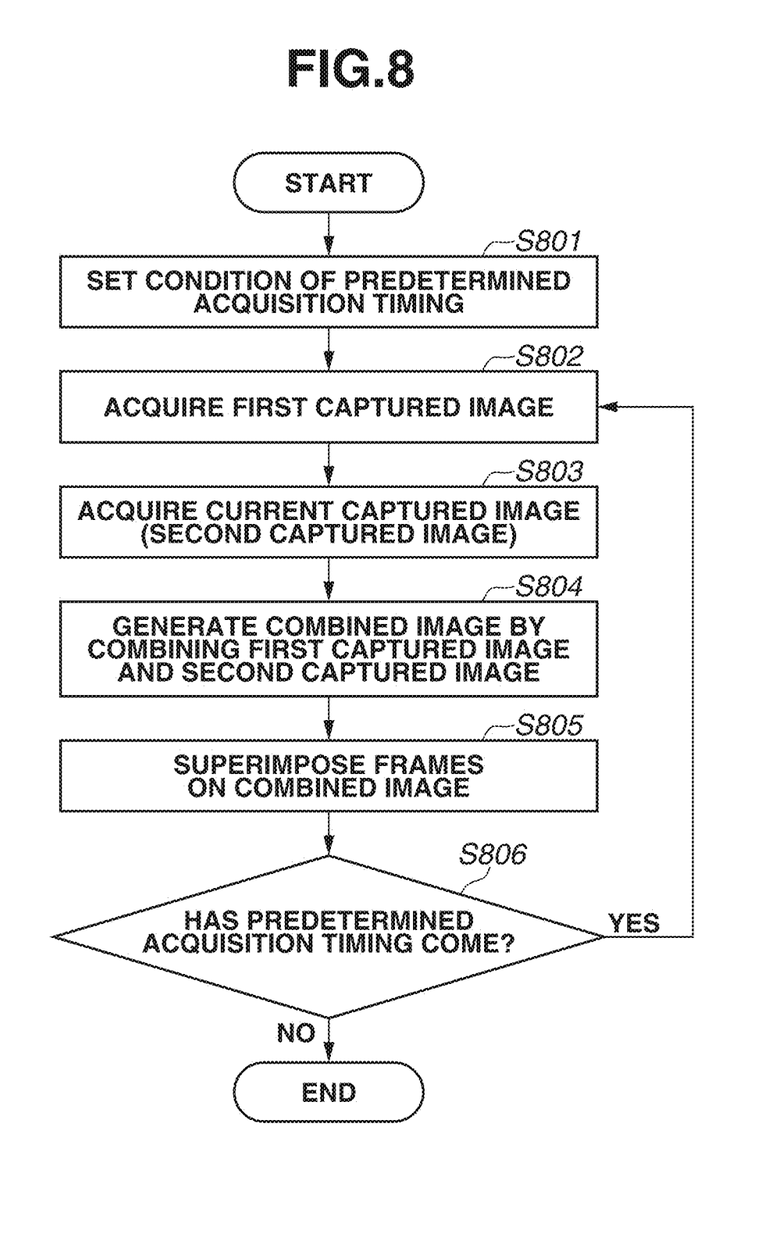
FIG. 8 is a flowchart illustrating processing performed by the imaging system according to the first exemplary embodiment.

Next, with reference to FIG. 8, processing of displaying, on the display unit 120, the combined image 401 with the assist image superimposed thereon will be described. FIG. 8 is a flowchart illustrating the processing performed by the imaging apparatus 101. The flowchart is implemented by a CPU executing a program loaded in a random access memory (RAM).

In step S801, the system control unit 108 sets a condition for a predetermined acquisition timing in response to an instruction from the user. For example, a setting to acquire the first captured image 406 again after a predetermined time has elapsed is made.

In step S802, the combined image generation unit 105 acquires the first captured image 406 including the captured image of the range imageable by performing the rotation drive, under the control of the system control unit 108.

In step S803, the system control unit 108 performs processing for acquiring the current captured image (second captured image 405). The captured image of the range corresponding to the current captured image is acquired also in step S802, but the system control unit 108 acquires the captured image again in step S803.

In step S804, the combined image generation unit 105 generates the combined image 401 by combining the first captured image 406 acquired in step S802 and the second captured image 405, which is the current captured image, under the control of the system control unit 108.

In step S805, the combined image generation unit 105 superimposes the frames 402 to 404 on the combined image 401 generated in step S804, under the control of the system control unit 108.

In step S806, the system control unit 108 determines whether a predetermined acquisition timing has come. The predetermined acquisition timing is a timing at which the current imaging range is changed, or a timing satisfying the condition set in step S801. In a case where the predetermined acquisition timing has not come (NO in step S806), the processing ends. In a case where the predetermined acquisition timing has come (YES in step S806), the processing returns to step S802.

As described above, it is possible for the user to easily grasp the imaging range at the rotation drive time, since the frames 402 to 404 indicating the imaging range at the rotation drive time are superimposed on the combined image 401 generated by combining the first captured image 406 including the captured image of the range imageable by performing the rotation drive and the second captured image 405, which is the current captured image.

In addition, in the present exemplary embodiment, the frames 402 to 404 are superimposed, but only some of the frames 402 to 404 may be superimposed. For example, as described with reference to FIG. 5C, in the case where the first captured image 406 is acquired by performing the rotation drive, the first captured image 406 is a circular image. Because an outline of the circular image coincides with the circular frame 404, the circular frame 404 does not necessarily need to be superimposed. Further, only with the circular frame 404 indicating the range imageable by performing the rotation drive, and the rectangular frame 402 corresponding to the second captured image 405, since the user can roughly grasp the imaging range when the imaging angle is changed by performing the rotation drive, the rectangular frame 403 does not need to be superimposed.

In the present exemplary embodiment, the example in which the imaging apparatus 101 functions as an information processing apparatus to which the present disclosure is applied is described, but it is not limited thereto. For example, the processing described to be performed by the imaging apparatus 101 in the present exemplary embodiment may be performed by the client apparatus 103, or another information processing apparatus (not illustrated) different from the imaging apparatus 101 and the client apparatus 103.

Next, with reference to FIGS. 9A and 9B, a second exemplary embodiment will be described. In the first exemplary embodiment, the configuration of generating the combined image 401 is described, but in the present exemplary embodiment, a configuration of not generating the combined image 401 will be described. The configuration and the basic processing operation of the imaging system 100 are similar to those of the first exemplary embodiment, and thus, the components and processing operations similar to those in the first exemplary embodiment are assigned the same reference numerals, and the descriptions thereof are omitted. The description of the present exemplary embodiment is given centering on points different from the first exemplary embodiment.

In the present exemplary embodiment, in the imaging apparatus 101, the combined image generation unit 105 acquires the first captured image 406 including the captured image of the range imageable by performing the rotation drive at a predetermined acquisition timing, under the control of the system control unit 108. Then, the combined image generation unit 105 superimposes the assist image indicating the imaging range at the rotation drive time on the first captured image 406.

The network processing unit 107 transmits the first captured image 406 on which the assist image is superimposed and the second captured image 405 (current captured image), to the client apparatus 103. In the client apparatus 103, the network processing unit 119 receives the first captured image 406 on which the assist image is superimposed and the second captured image 405, and displays the captured images on the display unit 120, under the control of the system control unit 121. In the present exemplary embodiment, the combined image generation unit 105 operating under the control of the system control unit 108 functions as an acquisition unit and a superimposing unit according to the present disclosure.

Figure 9A:
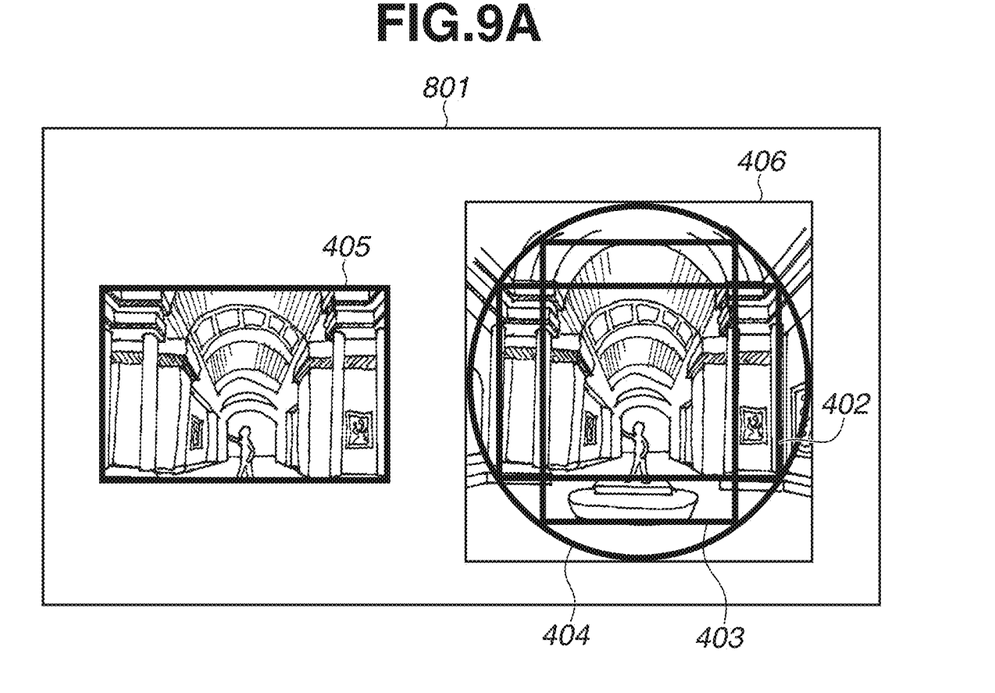
FIGS. 9A and 9B are diagrams each illustrating an example of an image displayed by the imaging system according to a second exemplary embodiment.
Figure 9B:
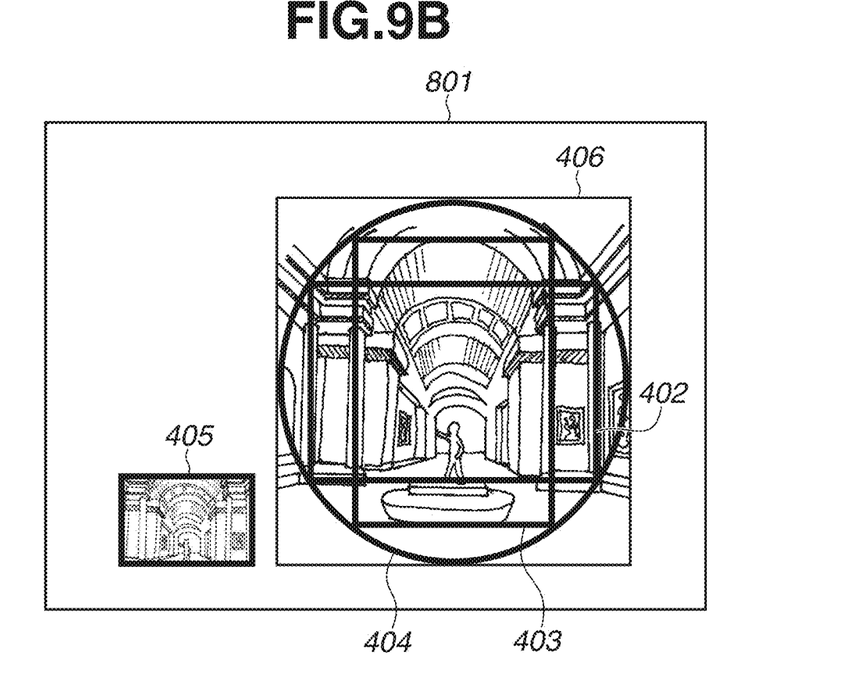

With reference to FIGS. 9A and 9B, the first captured image 406 on which the assist image is superimposed and the second captured image 405 to be displayed on the display unit 120 will be described. FIGS. 9A and 9B are diagrams each illustrating an example of an image 801 displayed by the imaging system 100.

As illustrated in FIGS. 9A and 9B, the first captured image 406 on which the frames 402 to 404 are superimposed and the second captured image 405 are arranged and displayed on a same screen. FIG. 9A illustrates an example of the first captured image 406, on which the frames 402 to 404 are superimposed, displayed beside the second captured image 405. FIG. 9B illustrates an example of the first captured image 406, on which the frames 402 to 404 are superimposed, displayed beside the thumbnail-displayed second captured image 405.

While the present disclosure is described above using the exemplary embodiments, all the above-described exemplary embodiments are merely examples of embodying of the present disclosure, and the technical range of the present disclosure shall not be construed in a limited manner. In other words, the present disclosure can be realized in diverse forms as long as it is in accordance with the technological thought or main features of the present disclosure.

The present disclosure can be realized by processing of supplying a program that implements one or more functions of the above-described exemplary embodiments to a system or an apparatus via a network or a storage medium, and one or more processors in the system or the apparatus reading and executing the program. Further, the present disclosure can also be realized by a circuit (e.g., application specific integrated circuit (ASIC)) that can implement one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-202405, filed Nov. 30, 2023, which is hereby incorporated by reference herein in its entirety.

What is claimed is:

1. An information processing apparatus comprising:
a hardware processor; and
a memory for storing instructions to be executed by the hardware processor,
wherein, when the instructions stored in the memory are executed by the hardware processor, the information processing apparatus functions as:
an acquisition unit configured to acquire a first captured image including a captured image of a range imageable by performing a rotation drive that rotates an imaging unit around an optical axis; and
a superimposing unit configured to superimpose an image indicating an imaging range at a time of the rotation drive on the first captured image acquired by the acquisition unit,
wherein, when the instructions stored in the memory are executed by the hardware processor, the information processing apparatus further functions as a combining unit configured to generate a combined image generated by combining the first captured image acquired by the acquisition unit and a second captured image being a current captured image,
wherein the superimposing unit superimposes, on the first captured image, a rectangular frame corresponding to the second captured image as the image indicating the imaging range at the time of the rotation drive.

2. The information processing apparatus according to claim 1, wherein the superimposing unit superimposes, on the first captured image, a circular frame indicating a range imageable by performing the rotation drive as the image indicating the imaging range at the time of the rotation drive.

3. The information processing apparatus according to claim 1, wherein the superimposing unit superimposes, on the first captured image, a different rectangular frame having a same size as the rectangular frame and being arranged to be coaxial and orthogonal to the rectangular frame as the image indicating the imaging range at the time of the rotation drive.

4. An information processing apparatus comprising:
a hardware processor; and
a memory for storing instructions to be executed by the hardware processor,
wherein, when the instructions stored in the memory are executed by the hardware processor, the information processing apparatus functions as:
an acquisition unit configured to acquire a first captured image including a captured image of a range imageable by performing a rotation drive that rotates an imaging unit around an optical axis; and
a superimposing unit configured to superimpose an image indicating an imaging range at a time of the rotation drive on the first captured image acquired by the acquisition unit,
wherein the acquisition unit combines captured images acquired by performing an imaging direction change drive to generate the first captured image.

5. An information processing apparatus comprising:
a hardware processor; and
a memory for storing instructions to be executed by the hardware processor
wherein, when the instructions stored in the memory are executed by the hardware processor, the information processing apparatus functions as:

an acquisition unit configured to acquire a first captured image including a captured image of a range imageable by performing a rotation drive that rotates an imaging unit around an optical axis; and a superimposing unit configured to superimpose an image indicating an imaging range at a time of the rotation drive on the first captured image acquired by the acquisition unit, wherein the acquisition unit combines captured images acquired by performing the rotation drive to generate the first captured image.

6. An information processing apparatus comprising:

a hardware processor; and a memory for storing instructions to be executed by the hardware processor, wherein, when the instructions stored in the memory are executed by the hardware processor, the information processing apparatus functions as:

an acquisition unit configured to acquire a first captured image including a captured image of a range imageable by performing a rotation drive that rotates an imaging unit around an optical axis; and a superimposing unit configured to superimpose an image indicating an imaging range at a time of the rotation drive on the first captured image acquired by the acquisition unit, wherein the acquisition unit acquires the first captured image again in a case where a predetermined condition is satisfied.

7. An information processing apparatus comprising:

a hardware processor; and a memory for storing instructions to be executed by the hardware processor, wherein, when the instructions stored in the memory are executed by the hardware processor, the information processing apparatus functions as:

an acquisition unit configured to acquire a first captured image including a captured image of a range imageable by performing a rotation drive that rotates an imaging unit around an optical axis; and a superimposing unit configured to superimpose an image indicating an imaging range at a time of the rotation drive on the first captured image acquired by the acquisition unit, wherein the acquisition unit acquires the first captured image again in a case where the imaging range is changed.

8. A control method for controlling an image processing apparatus, comprising:

acquiring a first captured image including a captured image of a range imageable by performing a rotation drive that rotates an imaging unit around an optical axis;

superimposing, on the first captured image, an image indicating an imaging range at a time of the rotation drive; and generating a combined image generated by combining the first captured image and a second captured image being a current captured image, wherein a rectangular frame corresponding to the second captured image as the image indicating the imaging range at the time of the rotation drive is superimposed on the first captured image.

9. A non-transitory computer readable storage medium storing a program for causing a computer to execute a control method, the control method comprising:

acquiring a first captured image including a captured image of a range imageable by performing a rotation drive that rotates an imaging unit around an optical axis;

superimposing, on the first captured image, an image indicating an imaging range at a time of the rotation drive; and generating a combined image generated by combining the first captured image and a second captured image being a current captured image, wherein a rectangular frame corresponding to the second captured image as the image indicating the imaging range at the time of the rotation drive is superimposed on the first captured image.

* * * * *